June 13, 1967 E. NASLUND ETAL 3,325,005
TABLEWARE SORTER
Filed Nov. 27, 1964 3 Sheets-Sheet 2
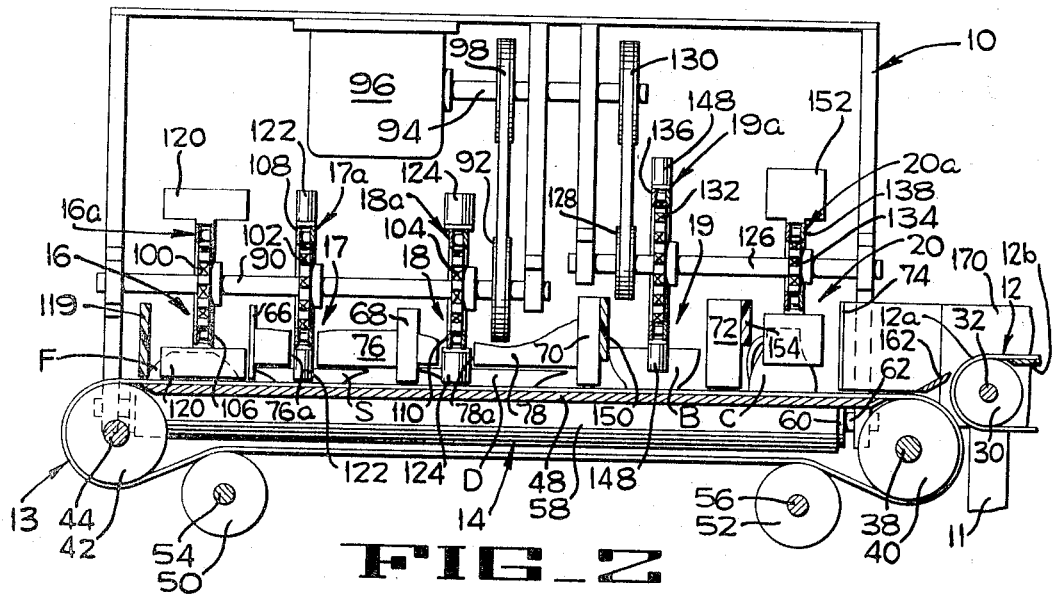
FIG_2
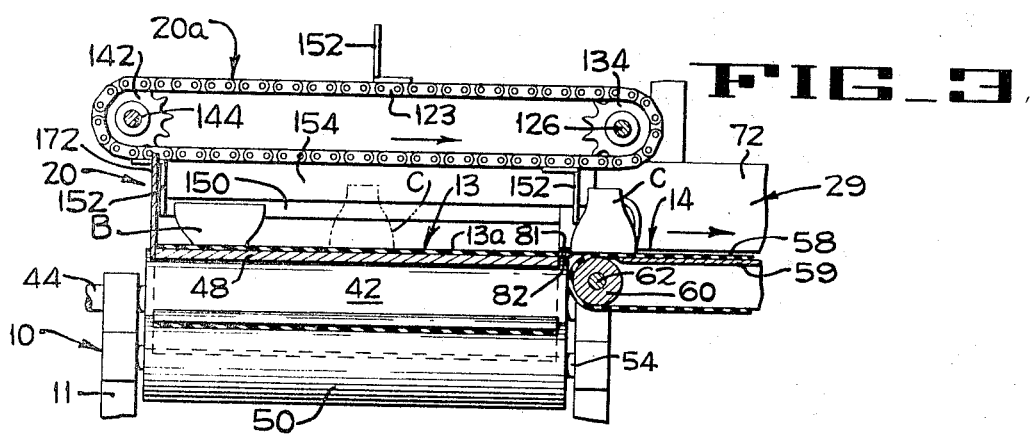
FIG_3
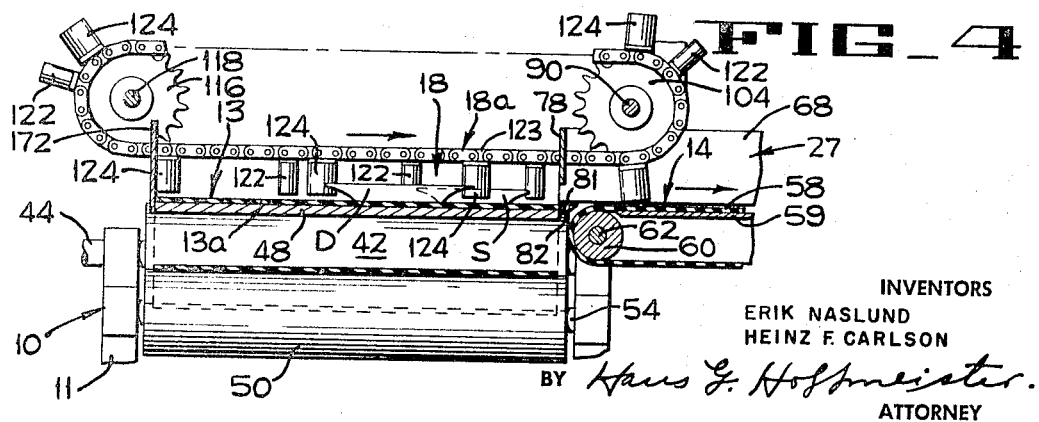
FIG_4
INVENTORS
ERIK NASLUND
HEINZ F. CARLSON
BY Hans G. Hoffmeister
ATTORNEY

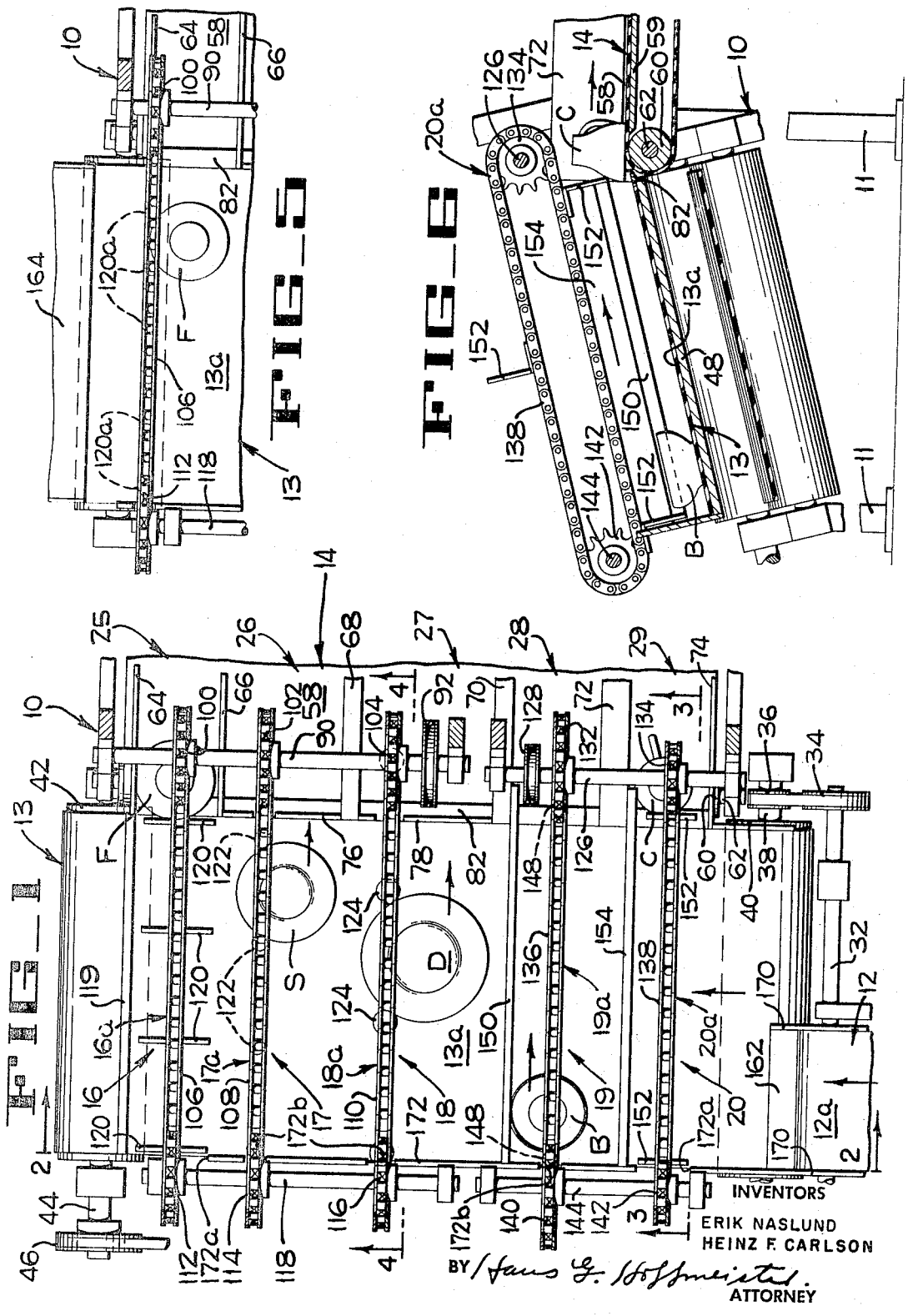

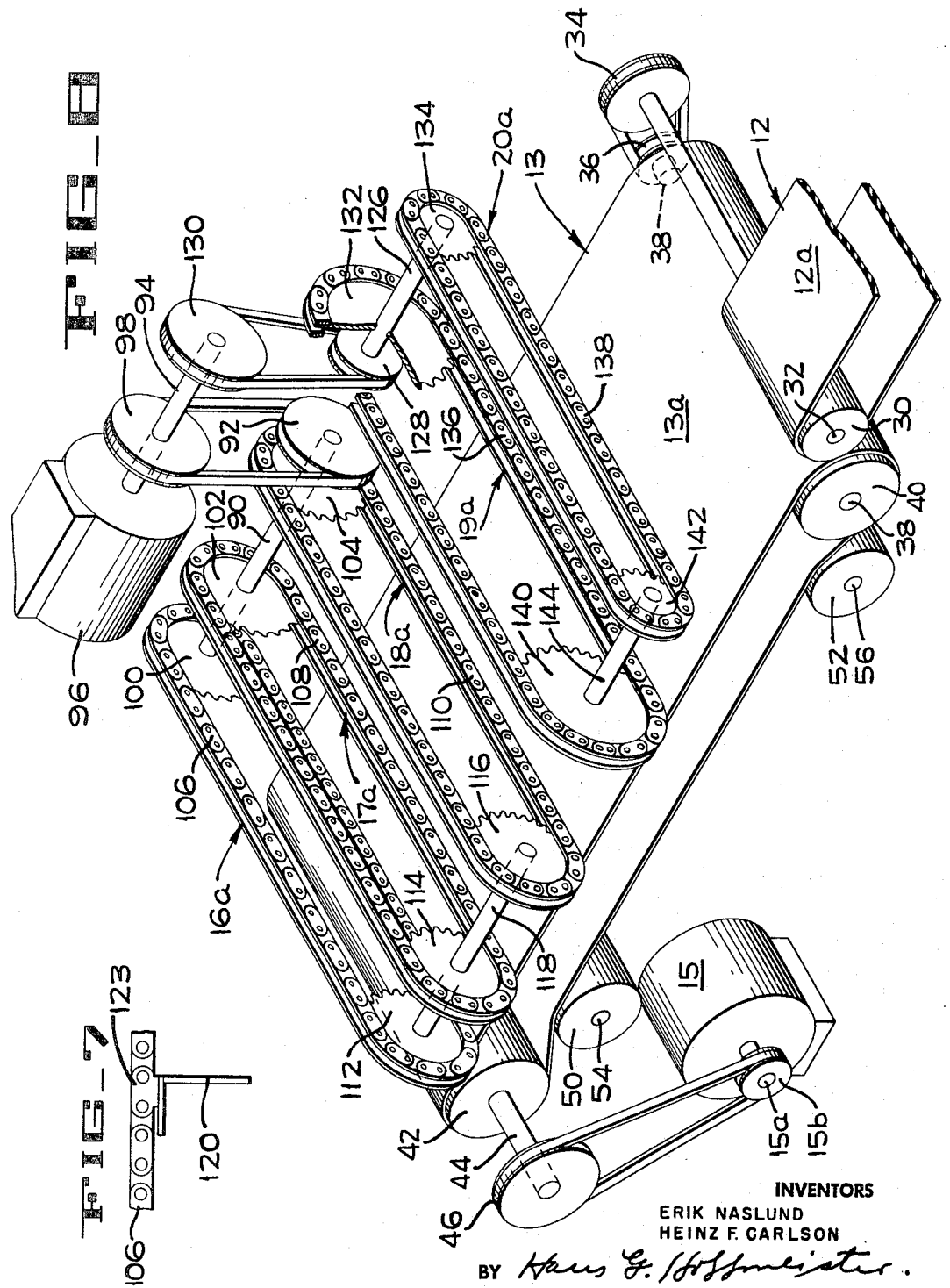

ably by reference to United States Patent Office
3,325,005
Patented June 13, 1967

3,325,005
TABLEWARE SORTER
Erik Naslund and Heinz F. Carlson, Santa Clara, Calif., assignors to FMC Corporation, San Jose, Calif., a corporation of California
Filed Nov. 27, 1964, Ser. No. 414,340
20 Claims. (Cl. 209—80)

The invention pertains to sorting devices, and one particularly for sorting articles according to their respective heights and diameters. In the case of articles which are not round, such as rectangular boxes, the invention pertains to sorting such articles according to their largest minor dimensions in a plane parallel to the article supporting surface.

The apparatus of the present invention is particularly adapted for sorting tableware in connection with automatic sculleries. The apparatus is capable of segregating in one operation a plurality of articles of different configurations, such as, dishes or tableware.

In one embodiment of the invention, the segregating device can be mounted on an oscillating support, such as the deck of a ship, and will operate satisfactorily as the ship rolls and pitches.

An object of this invention is to segregate a random assortment of tableware into spaced rows according to their heights and diameters.

Another object is to provide a device for segregating tableware as described above, with the device on an oscillating support.

Another object is to provide a device for segregating articles according to their largest minor dimensions in a plane parallel to the article supporting surface.

Another object is to provide a device for segregating articles as stated in the preceding object and to remove the articles from their supporting surface in a lateral direction substantially parallel to the surface of their supporting surface.

In principle, our invention accomplishes these objects in the case of circular tableware by providing apparatus for singulating a random assortment of tableware using a pair of endless belts moving at different speeds, intercepting certain of the tableware according to their heights, intercepting the remaining tableware according to their diameters and moving all of the intercepted tableware transversely of the belts to discharge zones where the tableware is placed on a discharge conveyor and removed for subsequent handling. In the case of noncircular articles the invention accomplishes these objects in the same manner by using deflecting elements which are so spaced that the articles having the largest minor dimensions in a plane parallel to the article supporting surface (the minor dimension in the case of a rectangle lying flat being its width whereas in the case of a circular article the minor dimension is its diameter) are first removed and those passing to the next deflecting elements downstream are then removed according to their largest minor dimensions, and so on until all the desired articles are segregated.

The invention may be more fully understood by referring to the following description and accompanying drawings in which:

FIGURE 1 is a plan of a preferred embodiment of the invention shown partly diagrammatically, partly in section and with parts removed.

FIGURE 2 is a vertical section of the preferred embodiment also shown partly diagrammatically and with parts removed, taken along the lines 2—2 of FIGURE 1.

FIGURE 3 is a vertical transverse section also shown partly diagrammatically, taken along the lines 3—3 of FIGURE 1, with part of a downstream segregating station shown for clarity.

FIGURE 4 is a transverse section also shown partly diagrammatically, taken along the lines 4—4 of FIGURE 1, with part of a downstream segregating station shown for clarity.

FIGURE 5 is a plan partly in section, with parts broken away and showing partly diagrammatically a modified form of one of the transfer conveyors shown in FIGURE 1.

FIGURE 6 is a transverse vertical section similar to FIGURE 3 but with parts of the segregating apparatus being inclined for use on an oscillating support.

FIGURE 7 is an enlarged detail of a typical link apparatus for attaching a pushing element to one of the endless chains shown in FIGURE 1.

FIGURE 8 is an enlarged diagrammatic isometric of the driving apparatus employed in the preferred embodiment.

In general, as shown in FIGURES 1 and 2, the table ware sorter comprises a frame 10 which includes a lower base portion 11 adapted for mounting on any suitable support, a feed conveyor 12, a sorting conveyor 13 and a plurality of segregating stations 16, 17, 18, 19 and 20 each having a transfer conveyor 16a, 17a, 18a, 19a and 20a for moving articles to a corresponding transverse discharge zone 25, 26, 27, 28, and 29. Segregated articles are removed from the discharge zones by a transverse discharge conveyor 14. Articles such as cups C (FIGS. 1, 2 and 3) are transferred from the feed conveyor 12 to the sorting conveyor 13 in singulated relation and are intercepted and moved to the discharge zone 29 at the segregating station 20. Other articles such as bowls B (FIGS. 1, 2 and 3), dinner plates D (FIGS. 1, 2 and 4), salad plates S (FIGS. 1, 2 and 4), and fruit dishes F (FIGS. 1 and 2) are intercepted at the respective segregating stations 19, 18, 17 and 16 and are then transferred to their respective discharge zones 28, 27, 26 and 25. It should be noted, that the invention is not limited to tableware, per se, but is readily adapted to other objects having a variety of widths and heights.

The drive train for the apparatus will now be described. The feed conveyor 12 comprises a belt 12a trained about a roller 30 which is keyed to a shaft 32, as best shown in FIGURES 1, 2 and 8. The shaft 32 is driven by a belt and pulley arrangement 34 which is connected to a second pulley 36 keyed to a shaft 38 journalled on the frame 10. The belt 12a is also trained about an idler pulley, not shown, journalled on the frame 10 in any well-known manner, and its upper run rides on a support plate 12b mounted on the frame 10. The sorting conveyor 13 comprises a belt 13a trained around an idler roller 40 keyed to the shaft 38 and a driven roller 42 keyed to a shaft 44. The sorting conveyor 13 functions to carry the various tableware from the feed conveyor 12 to the various segregating stations 19, 18, 17 and 16 where they are intercepted and transferred to the discharge conveyor 14. A belt and pulley arrangement 46 is keyed to the shaft 44 and to a pulley 15b keyed on the shaft 15a of a motor 15 (FIG. 8). The upper run of the sorting belt 13a rides on a table 48 mounted on the frame 10 whereas the bottom run of the belt is tensioned by a pair of rollers 50 and 52 keyed to shafts 54 and 56, respectively, journalled on the frame 10.

The discharge conveyor 14 comprises a belt 58 for the segregated articles which is trained about an idler roller 60 having a longitudinal axis which is parallel to the longitudinal axis of the sorting belt 13a and is keyed on a shaft 62 journalled on the frame 10. The belt 58 is also trained about a roller, which is driven by any suitable motor and drive arrangement, not shown. The details of the drive for the discharge belt 58 are not critical. In some cases it could be replaced by a downwardly inclined chute for removing the dishes. The discharge belt 58 rides on a horizontal support plate 59 mounted on the frame 10.

A plurality of vertical dividers 64, 66, 68, 70, 72 and 74 (FIGS. 1 and 2) are fixed to the frame 10 in a manner such that their lower edges are closely adjacent the top run of the belt 58. The vertical dividers separate the top run of the belt 58 into the separate discharge zones 25, 26, 27, and 28 and 29, as was previously mentioned. The spacings between the individual dividers permit passage therebetween of the particular piece of flatware moved into the discharge zone from the segregating station associated therewith, but in the case of the first two zones 29 and 28, the farthest upstream on the belt 13a, the spacings between the dividers 70, 72 and 74 are such that the plates D and S have diameters larger than the bowls B or the cups C, will be precluded from entering into the discharge zones 29 and 28 by the ends of the dividers 70, 72 and 74, whereas, the bowls B and the cups C will be permitted to pass. As shown in FIGURES 1 and 2, discharge barriers 76 and 78 are fixed between the dividers 66, 68 and 70, and are spaced above the edge of the sorting belt 14 at the discharge zones 26 and 27. Thus a plate D may pass beneath the barrier 78, and a plate S may pass beneath the barrier 76, but the fruit dishes F, which are of a height greater than that of the plates D and S will be precluded from passing into the zones 26 and 27. Mounted on the bottom edges of the divider plates 64, 66, 68, 70, 72 and 74 are a plurality of spacers 81 which are fixed to the upper surface of a long guide plate 82 by any suitable means, such as welding (FIG. 3). The plate 82 fits snugly between the edge of the sorting belt 13a and the belt 58, and lies in the same plane thereof, providing a smooth transition portion for supporting the flatware across the space between the two belts.

The drive arrangement for the transfer conveyors 16a, 17a, 18a, 19a and 20a, is best shown in FIGURES 1, 2 and 8, and comprises a first main drive shaft 90 journalled on the frame 10 above the belt 58. A drive pulley 92 is keyed to the shaft 90 and is coupled to the drive shaft 94 of a motor 96 by a belt and pulley drive 98. Keyed on the shaft 90 are a plurality of sprockets 100, 102 and 104 having, respectively, endless chains 106, 108 and 110 trained around them. The chains 106, 108 and 110 are also trained around a plurality of sprockets 112, 114 and 116, respectively, which are keyed on a shaft 118 journalled on the frame 10 above the side edge of the sorting belt 13a farthest from the discharge belt.

At the segregating station 16, a barrier 119 for intercepting the fruit dishes F extends transversely above the entire width of the sorting belt 13a downstream of the chain 106 and is spaced closely to the upper run of the belt 13a. The transfer conveyor 16a comprises a plurality of L-shaped plates or pushing elements 120 mounted on special links 123 as by welding, which links are part of the chain 106 (FIG. 7). The plates 120 are spaced from one another a distance sufficient to permit an aritcle, such as a fruit dish F, to pass therebetween. When the plates are carried on the lower run of the chain 106, they are spaced such that their lowermost edges are closely adjacent the upper run of the sorting belt 13a.

At the segregating station 17, the transfer conveyor 17a comprises a plurality of pins, arrestors or pushing elements 122 fastened at the outermost edge of the chain 108 on another set of the special links 123, in the same manner as the plates 120, but are spaced from one another a distance slightly less than the diameter of a circular article, such as the salad plate S. The pins 122 when traveling on the lower run of the chain 108 also project downwardly so that their free ends are spaced closely adjacent the upper run of the sorting belt 13a. A cut-out portion 76a is provided in the barrier 76 for permitting the pins 122 to freely pass therethrough (FIG. 2). When the pins 122 are moved along the sorting belt 13a, they trap the salad plates S of diameters too small to pass therebetween and transport the plates to the discharge belt 58.

At the segregating station 18, the transfer conveyor 18a comprises a plurality of pins or pushing elements 124 fastened at the outermost edge of the chain 110 on another set of the links 123, in the same manner as plates 120, and are spaced from one another a distance slightly less than the diameter of a circular article, such as the dinner plate D, but a distance greater than the diameters of either the fruit dishes F or the salad plates S. The pins 124 when traveling on the lower run of the chain 110 also project downwardly so that their free ends are spaced closely adjacent to the upper run of the sorting belt 13a. A cut-out portion 78a is provided in the barrier 78 for permitting the pins 124 to freely pass therethrough. The pins 124 trap the dinner plates D and transport them to the discharge belt 58.

A second main drive shaft 126 is journalled on the frame 10 above the discharge belt 58 in a manner similar to the first main drive shaft 90. A pulley 128 is keyed thereon and is coupled to the drive shaft 94 of the motor 96 by a belt and pulley arrangement 130. Also keyed on the shaft 126 are a pair of sprockets 132 and 134. A pair of chains 136 and 138 are trained around the sprockets 132 and 134, respectively, and around two other sprockets 140 and 142 respectively, which are keyed on a shaft 144. The shaft 144 is freely journalled on the frame 10 above the edge of the sorting belt 13a farthest away from the discharge belt 58 in a manner similar to the shaft 118.

At the segregating station 19, the transfer conveyor 19a comprises a plurality of pins or pushing elements 148 fastened at the outermost edge of the chain 136 on another set of the links 123, in a manner similar to the plates 120, but the pins 148 are spaced from one another a distance approximately equal to the width of the sorting belt 13a, in other words with no more than three such pins 148 on the chain 136. The spacing between the pins 148 is not critical except that ample room must be provided such that no two pins 148 can engage an article between them which is to be segregated farther downstream on the sorting belt 14 such as, dinner plates D, salad plates S or fruit dishes F. In other words, the spacing between the pins 148 must provide access for free passage therebetween of all of the articles to be segregated downstream thereof. A transverse vertical barrier 150 is mounted on the frame 10 in a plane perpendicular to the upper run of the sorting belt 13a. The lower edge of the barrier 150 is spaced above the upper run of the sorting belt 14 a distance just less than the height of an article, such as, the bowl B for engagement therewith, but is spaced sufficiently from the belt 13a to allow passage therebetween of the articles to be sorted farther downstream such as, the fruit dishes F, the salad plates S and dinner plates D. The pins 148 are moved across the sorting belt 13a and transport the bowls B to the discharge belt 58.

At the segregating station 20, the transfer conveyor 20a comprises a plurality of L-shaped plates or pushing elements 152 fastened at the outermost edge of the chain 138 on another set of the links 123, in the same manner as plates 120, and are spaced from one another a distance such that the articles to be segregated farther downstream on the sorting belt 13a may pass freely between, in a manner similar to the pins 148 on the chain 136. The free ends of the plates 152 project downwardly when traveling along the lower run of the chain 138 and are spaced closely adjacent to the upper run of the sorting belt 13a in a manner similar to the plates 120. A transverse vertical barrier 154 is fastened on the frame 10 above the sorting belt 13a in a plane perpendicular to the upper run of the belt 13a. The lower edge of the barrier 154 is spaced above the upper run of the sorting belt 13a a distance just less than the height of articles, such as, the cups C, but yet high enough to allow free passage of articles to be segregated farther downstream on the belt 13a such as, the fruit dishes F, salad plates S, dinner plates D and bowls B. The plates 152 are moved across the sorting belt 13a and transport the cups C to the discharge belt 58.

A chute 162 is mounted on the frame at the inlet end or right hand end, as viewed in FIGURE 2, of the sorting belt 13a and is positioned closely adjacent the upper surface of the belt 13a and the upper surface of the discharge end of the feed belt 12a. The chute 162 extends across the full width of the feed belt 12a and guides articles which are discharged from the feed belt 12a on to the sorting belt 13a. A pair of vertical side plates 170 are fastened on the frame 10 adjacent the edges of the upper run of the feed belt 12a to prevent articles from falling off the belt. Another vertical side plate 172 is positioned along the edge of the upper run of the sorting belt 13a farthest from the discharge belt 58 and is provided with cut-out portions 172a and 172b to permit passage of the plates 120 and 152 and the pins 122, 124 and 148, respectively.

In the operation of the device, articles are placed on the feed belt 12a in a random assortment, for example, in the case of flatware, by mess personnel who empty trays of the tableware on to the belt after first removing extraneous articles such as flatware and trash. The tableware moves toward the sorting belt 13a on the feed belt 12a at a speed of approximately 30 feet per minute. The tableware is discharged on to the sorting belt 13a which is traveling at a speed of approximately 80 feet per minute. The articles are discharged from the feed belt in a substantially single file and are separated or singulated as they arrive on the belt 13a. Since the speed of the sorting belt 13a is greater than the feed belt 12a. As the tableware progresses on the sorting belt 13a, all of the articles of a height greater than the distance between the top of the belt 13a and the first upstream barrier 154 are intercepted by the barrier 154 and slide on the sorting belt 13a.

The intercepted articles, namely, the cups C, since they are the highest, continue to slide on the sorting belt 13a until they are engaged by the plates or pushing elements 152. The plates 152 then push the cups laterally across the sorting belt 13a, along the barrier 154, over the plate 82 between the dividers 72 and 74 and into the discharge zone 29 on the discharge conveyor 14 where they are removed for some subsequent operation. Articles of a height less than the height of the cups C continue beneath the barrier 154 until articles of a height greater than the distance between the lower edge of the barrier 150 and the sorting belt 13a are intercepted by the barrier 150 and slide on the upper surface of the belt 13a. These articles, such as bowls B are engaged by the pins 148 and are moved laterally across the belt 13a, along the barrier 150, over the plate 82, between the dividers 70 and 72, and into the discharge zone 28 on the discharge belt 58. The remaining articles passing beneath the barrier 150 continue to be carried on the belt 13a until articles of a diameter larger than the space between the pins 124, such as, the dinner plates D are intercepted by the pins 124 traveling transversely across the upper run of the sorting belt 13a and are carried therewith over the plate 82, between the dividers 68 and 70, beneath the discharge barrier 78, and into the discharge zone 27 on the discharge belt 58. The frictional force between the upper run of the sorting belt 13a and the adjacent edges of the dinner plate D help to maintain the dinner plate in abutting relation with the pins 124 during the transverse movement. Articles of a diameter less than the distance between the pins 124 continue to move along on the belt 13a until articles having a diameter greater than the distance between the pins 122, such as, the salad plates S are intercepted by the pins 122 and carried along therewith. The pins 122 connected to the chain 108 move the salad plates S laterally across the sorting belt 13a over the plate 82, between the dividers 66 and 68, beneath the discharge barrier 76 and into the discharge zone 26 on the discharge belt 58. The salad plates S are also maintained against the pins 122 by the frictional force of the sorting belt 13a, in the manner described for the plates D. The remaining articles, namely, the fruit dishes F, having a diameter less than the distance between the pins 122 pass therethrough and are intercepted by the barrier 119 which is spaced closely to the top of the sorting belt 14. The fruit dishes F are then engaged by the pushing elements 120 and are moved transversely across the upper run of the sorting belt 13a, over the plate 82, between the dividers 64 and 66 and into the discharge zone 25 on the discharge conveyor 58.

As is shown in FIGURE 8, the speeds of the various transverse chains may be varied; however, it is desirable that the speed of the pins 124 be sufficient to remove the large dinner plates D at a rate such that the smaller salad plates S and the fruit dishes F may pass between the pins 124 without undue obstruction from plates D being carried therebetween. A typical speed for these pins 124 would be 50 feet per minute when the sorting belt is traveling at 80 feet per minute. The relative speeds for the feed belt, the sorting belt and the transverse chains are cited only for exemplary purposes of a typical embodiment but it should be understood that these speeds may be varied dependent upon the consistency of any one article appearing in the random assortment. As a further example, assume no salad plates S are found in the assortment of tableware placed on the feed belt 12a. The speed of the pins 124 may then be slower since fewer articles will be passing between them. Similarly, should more articles be in the assortment than are provided for in the described embodiment, it is only necessary to lengthen and widen the sorting belt 13a, providing more segregating stations and adjusting the relative speeds of the shaft 90 and the shaft 126 to handle the increased load. To further assure that no article is mis-segregated into the wrong discharge zone, such as, where a fruit dish F may ride up on a dinner plate D and be carried laterally therewith, the discharge barriers 76 and 78 will obstruct the passage of the fruit dish F until it is free of the dinner plate D and is again carried downstream on the sorting belt 13a. The barriers and the pushing elements are all made of plastic material to avoid damaging the articles contacted thereby.

A slight modification of the preferred embodiment is shown in FIGURE 5, which is identical to the embodiment just described with the exception that the plates 120 and the barrier 119 are replaced by a plurality of spaced pins 120a which are mounted on the outermost edge of the chain 106 on another set of special links 123, in a manner identical to the pins 122. The pins 120a are spaced a distance just less than the diameter of the fruit dishes F and engage the fruit dishes F in a manner identical to the manner in which the pins 122 engage the salad plates S. Consequently, instead of segregating the fruit dishes F by using a barrier, the fruit dishes F in the modification shown in FIGURE 5 are segregated according to diameter. A chute 164 is fastened on the frame 10 at the downstream end of the sorting belt 13a, the left end as viewed in FIGURE 2, and is positioned to receive pieces of broken tableware or extraneous matter too small to have been intercepted at any of the segregating stations. The chute 164 empties into any suitable disposal apparatus, not shown.

A second modification is shown in FIGURE 6, wherein the apparatus is identical to the preferred embodiment previously described, with the exception that the feed belt 12a, the sorting belt 13a, and the transfer conveyors 16a, 17a, 18a, 19a and 20a are all downwardly inclined away from the discharge belt 58 at an angle which is no greater than the angle of repose for the tableware on the belt 13a when the support has oscillated to its maximum clockwise position, as viewed in FIGURE 6. It has been found that when the tableware sorter is secured on an oscillating support, such as, aboard a vessel at sea having a known roll or pitch angle, there is an undesirable tendency for the tableware to slide in the direction of the discharge belt 58 when the ship rolls or pitches clockwise, as viewed in FIGURE 6, depending upon the location of the sorter. By providing the inclination downwardly away from the discharge conveyor 58, the articles slide due to the force of gravity to the left, as viewed in FIGURE 6, when the ship's floor, upon which the frame 10 is mounted, tilts counterclockwise and are normally unable to move except by positive pushing when the ship's floor tilts clockwise, as viewed in FIGURE 6, because, as aforementioned, the angulation of the belts will also be tilted downward to the right along with the ship's floor but at an angle less than the angle of repose of the articles. It is more desirable to have the articles slide to the left since the pins and pushing elements will positively engage them and ample time is presented, across the entire width of the sorting belt 13a to dislodge any articles which may be overlapping one another.

Thus, as can be readily seen, the tableware sorter embodied in the present invention is readily adaptable for segregating large quantities of tableware or other articles on the basis of diameter and height. It has the further advantage of accomplishing this result in a manner which substantially reduces the amount of breakage necessarily incidental in automatic sorting devices. A still further advantage is the feature of providing for the oscillating motion of the support on which the sorting apparatus is mounted, particularly, when utilized aboard a ship at sea.

While the preferred apparatus for carrying out the invention has been shown and described, it will be understood that it is capable of modification and variation while still operating according to the principles of the invention. It is to be understood, therefore, that the scope of the invention is limited only by the claims appended hereto.

Having thus described the invention, that which is believed to be new and for which protection by Letters Patent is desired, is:

1. A sorting device comprising a frame, a sorting conveyor on said frame for conveying a singulated series of circular articles of various diameters along a path, at least two transfer conveyors spaced along said path and moving laterally of the path, said laterally moving transfer conveyors each having a reach overlying said sorting conveyor, said upstream transfer conveyor being provided with a plurality of pushing elements spaced such that articles of one diameter will be trapped between said pushing elements and carried laterally of said path, the downstream transfer conveyor also being provided with a plurality of spaced pushing elements, said latter elements being more closely spaced than those of said upstream transfer conveyor so that at least some of the articles that cleared the upstream pushing elements are trapped between said latter pushing elements and carried laterally of said path, whereby the articles are segregated and removed according to their diameters.

2. The sorting device as defined in claim 1 including means for supplying the articles in said singulated series, said supplying means including a feed belt mounted along said path for movement at a first linear speed, said sorting conveyor positioned for receiving the articles from said feed belt and mounted for movement at a speed greater than said feed belt, and means for moving said belts whereby the articles arriving on said sorting conveyor are spaced from the articles remaining on said feed belt due to the greater speed of said sorting conveyor.

3. The sorting device as defined by claim 1 including means for removing the articles carried laterally of said path by said transfer conveyors, said frame including a base portion adapted to be mounted on a support which is oscillatable with respect to the horizontal, said sorting conveyor and said transfer conveyors being inclined at an angle with respect to said support which is no greater than the angle of repose of the articles on said belts when said support is oscillated downwardly toward said removing means.

4. The sorting device as defined by claim 1 wherein said sorting conveyor is mounted for movement at a first linear speed, means for moving said upstream transfer conveyor at a speed with respect to the speed of said sorting conveyor such that the articles trapped by said pushing elements are carried laterally of said path at a rate sufficient to permit passage therebetween of the articles of a diameter less than the spacing of said upstream pushing elements without undue obstruction by the articles trapped by said upstream pushing elements.

5. A sorting device comprising a frame, a sorting conveyor on said frame for conveying a singulated series of circular articles of various heights and diameters along a path, a first set of at least two transverse barriers spaced along said path and overlying said sorting conveyor, the upstream barrier being spaced vertically from said sorting conveyor a distance such that articles of one height will be intercepted by the upstream barrier, whereas the articles of lesser height will clear the upstream barrier, an upstream transfer conveyor positioned for engaging and for carrying the intercepted articles laterally of said path, the downstream barrier being spaced vertically from said sorting belt a distance less than the height of spacing of said upstream barrier, such that at least some of the articles that cleared the upstream barrier will be intercepted by the downstream barrier, a downstream transfer conveyor positioned for engaging the articles intercepted by said downstream barrier and for carrying the articles laterally of said path; a second set of at least two laterally moving transfer conveyors spaced along said path each having a reach overlying said sorting conveyor and downstream of said barriers, the upstream transfer conveyor of said second set being provided with a plurality of pushing elements spaced such that the articles of one diameter will be trapped between said pushing elements and carried laterally of said path, the downstream transfer conveyor of said second set also being provided with a plurality of spaced pushing elements, said latter pushing elements being more closely spaced than those of said upstream transfer conveyor so that at least some of the articles that cleared the upstream pushing elements of said second set are trapped between said latter pushing elements and carried laterally of said path, whereby the articles are segregated and removed according to their heights and diameters.

6. A sorting device comprising a frame, a sorting conveyor on said frame for conveying a singulated series of articles of various heights along a path, at least two fixed transverse barriers spaced along said path and overlying said sorting conveyor, said upstream barrier being vertically spaced from said sorting conveyor a distance less than the articles of one height, an upstream transfer conveyor being provided with a plurality of pushing elements extending outwardly below said transfer conveyor for engaging and for carrying the articles intercepted by said upstream barrier laterally of said path, said downstream barrier being vertically spaced from said sorting conveyor a distance less than the spacing of said upstream barrier, so that at least some of the articles that cleared the upstream barrier will be intercepted by the downstream barrier, a downstream transfer conveyor being provided with a plurality of pushing elements extending outwardly below said transfer conveyor for engaging the articles intercepted by said downstream barrier and for carrying the articles laterally of said path, whereby the articles are segregated and removed according to their heights.

7. A sorting device comprising a frame, means on said frame for conveying a singulated series of circular articles of various diameters along a path with their diameters substantially parallel to the path, at least two means spaced along said path for intercepting and for carrying laterally of said path the circular articles of various diameters, said upstream means intercepting and carrying laterally of said path articles of one diameter disposed substantially parallel and transversely of the path, said downstream means intercepting and carrying laterally of said path articles of a diameter disposed substantially parallel and transversely of the path and smaller than the diameters of the articles intercepted by said upstream means, and means for receiving and for removing the articles carried by said two means spaced along said path, whereby the articles are segregated and removed according to their diameters.

8. A device for sorting a random assortment of circular articles having predetermined heights and diameters comprising means for conveying a singulated series of the articles along a path with their diameters disposed parallel to the path, first means positioned along said path for intercepting and for transferring the singulated articles laterally of said path according to their heights above the path, second means spaced along said path and positioned for intercepting and for transferring the articles laterally of said path according to their diameters disposed parallel to the path and means positioned for receiving and for removing the intercepted articles from said transferring means.

9. A device for segregating a random assortment of tableware having predetermined heights and diameters comprising means for supplying a singulated assortment of tableware, a longitudinal sorting belt positioned for receiving the tableware from said supplying means and carrying the tableware at a predetermined speed, a first transverse barrier spaced vertically above said sorting belt a first distance for intercepting the tableware of a first height, first pushing means movable into positions for engaging and for moving the tableware intercepted by said first barrier laterally of said sorting belt to a first discharge zone on a discharge conveyor, a second transverse barrier spaced vertically above said sorting belt a distance less than the spacing of said first barrier and downstream of said first barrier for intercepting at least some of the tableware that cleared said first barrier, second pushing means moveable into positions for engaging and for moving the articles intercepted by said second barrier to a second discharge zone on said discharge conveyor, third pusher means having a plurality of pins spaced from each other for intercepting and for moving tableware of a first diameter laterally of said sorting belt to a third discharge zone on said discharge conveyor, fourth pusher means having a plurality of pins spaced less than the spacing of said pins of said third pusher means for intercepting and for moving tableware of a second diameter which is smaller than said first diameter to a fourth discharge zone on said discharge conveyor, and means for intercepting and for moving tableware remaining on said sorting belt laterally of said sorting belt to a fifth discharge zone on said discharge conveyor.

10. The segregating device as defined by claim 9 wherein said last named means includes a third transverse barrier spaced vertically above said sorting belt for intercepting the remaining tableware and fifth pushing elements moveable into positions for engaging and for carrying the intercepted tableware laterally of said sorting belt to said fifth discharge zone.

11. The segregating device as defined by claim 9 wherein said last named means includes a plurality of pins spaced from one another a distance less than the spacing of said pins of said fourth pusher means for intercepting and for moving the remaining tableware of a third diameter laterally of said sorting belt to said fifth discharge zone.

12. The segregating device defined by claim 9 including means positioned at each of said discharge zones for precluding passage of tableware into said discharge zone which is of a configuration that would normally be segregated downstream of that discharge zone.

13. A device for segregating circular tableware interspersed with broken pieces of tableware comprising a longitudinal sorting belt moving in a first direction for conveying a singulated series of tableware interspersed with broken pieces of tableware, means mounted above said belt and spaced therefrom in a manner such that the tableware of a first height are intercepted, means for moving the intercepted tableware laterally of said belt to discharge means mounted in a position for receiving the tableware, means for intercepting and for moving laterally of said sorting belt to said discharge means tableware on said sorting belt of a first diameter, and a chute positioned at the downstream end of said sorting belt for receiving the broken pieces of tableware on said belt.

14. A device for segregating a random assortment of dishes of various heights and diameters comprising a frame having a base portion adapted to be mounted on a support which is oscillatable with respect to the horizontal, a longitudinal sorting conveyor moveably mounted on said frame for carrying a singulated series of dishes, means positioned on said frame for intercepting and for moving the dishes laterally of said sorting conveyor according to their heights and diameters, means mounted on said frame in a position for receiving the intercepted dishes and for removing said dishes from said sorting conveyor, said sorting conveyor and said means for intercepting and moving the dishes laterally of said sorting conveyor being positioned on said frame at a downwardly inclined angle with respect to said support means which is no greater than the angle of repose of the dishes on said sorting conveyor when said support is oscillated downwardly toward said removing means whereby the dishes will be precluded from moving toward said removing means by the force of gravity due to the oscillations of said support.

15. A sorting device comprising a frame, means on said frame for moving a plurality of articles along a predetermined path, said article moving means having an article supporting surface, first means positioned in said path for deflecting laterally off said article supporting surface certain of the articles according to their largest minor dimensions in a plane parallel to said article supporting surface, second means spaced along said path downstream of said first means for deflecting laterally off said article supporting surface certain of the remaining articles having largest minor dimensions in a plane parallel to said article supporting surface which are smaller than the largest minor dimensions in a plane parallel to said article supporting surface of the articles deflected by said first means so that the articles are all segregated according to their largest minor dimensions parallel to said supporting surface.

16. The device defined by claim 15 wherein said article moving means is a power driven conveyor.

17. The sorting device defined by claim 15 wherein said first and second deflecting means move the articles laterally in a direction parallel to the plane of said supporting surface.

18. The sorting device defined by claim 17 wherein said first and second deflecting means each include a movable chain conveyor having a plurality of spaced pins extending outwardly therefrom.

19. An article sorting device comprising a movable article supporting surface, means for moving said article supporting surface through a predetermined path, a first set of arrestors overlying said article supporting surface and spaced from one another transversely of said path a first distance, a second set of arrestors positioned along said path from said first set of arrestors and spaced from one another transversely of said path a second distance less than said first distance whereby articles having the largest minor transverse dimensions are intercepted by said first set of arrestors and articles of smaller minor transverse dimensions are allowed to pass therebetween to be intercepted by said second set of arrestors, and means for moving said first and second sets of arrestors for clearing the articles off said supporting surface.

20. An apparatus for sorting articles comprising a frame, means on said frame for moving a plurality of articles of various shapes and sizes along a predetermined path, said article moving means including an article supporting surface, means positioned along the path and spaced thereabove a distance sufficient to intercept the articles of the greatest height above said article supporting surface and for deflecting these tallest articles laterally off said article supporting surface, second means positioned along the path for intercepting the articles having the greatest minor dimensions disposed substantially parallel to the path but being of a height above said article supporting surface less than the tallest of the articles and for deflecting these articles laterally off said article supporting surface, whereby the articles are segregated according to height above said article supporting surface and minor dimensions substantially parallel to the path, and means for receiving the articles deflected from off said article supporting surface.

References Cited

UNITED STATES PATENTS

| | | | |
|---|---|---|---|
| 1,374,127 | 4/1921 | Weibull | 209—75 X |
| 2,570,395 | 10/1951 | Siegal | 209—90 |
| 2,999,576 | 9/1961 | Glembring | 209—83 X |
| 3,059,770 | 10/1962 | Fichtmuller | 209—97 X |
| 3,110,400 | 11/1963 | Early | 209—75 X |

M. HENSON WOOD, Jr., *Primary Examiner.*

R. SCHACHER, *Assistant Examiner.*